(12) United States Patent
Hund et al.

(10) Patent No.: US 7,972,478 B2
(45) Date of Patent: Jul. 5, 2011

(54) METHOD OF PRODUCING HIGH DRY STRENGTH PAPER AND CARDBOARD AND PAPER AND CARDBOARD THUS OBTAINED

(75) Inventors: René Hund, Villars (FR); Christian Jehn-Rendu, Saint Marcellin en Forez (FR); Fabrice Moretton, Lyons (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 672 days.

(21) Appl. No.: 11/813,955

(22) PCT Filed: Jan. 11, 2006

(86) PCT No.: PCT/FR2006/050012
§ 371 (c)(1),
(2), (4) Date: Apr. 8, 2008

(87) PCT Pub. No.: WO2006/075115
PCT Pub. Date: Jul. 20, 2006

(65) Prior Publication Data
US 2008/0196851 A1 Aug. 21, 2008

(30) Foreign Application Priority Data
Jan. 17, 2005 (FR) ..................... 05 50135

(51) Int. Cl.
*D21H 15/00* (2006.01)
(52) U.S. Cl. ............... 162/164.6; 162/164.1; 162/168.1; 162/168.2; 162/168.3; 525/343; 525/328.4; 525/329.2
(58) Field of Classification Search ............... 162/164.1, 162/164.6, 168.1–168.3; 525/328.4, 329.2, 525/343
See application file for complete search history.

(56) References Cited

U.S. PATENT DOCUMENTS

| | | | | | |
|---|---|---|---|---|---|
| 5,185,062 | A | * | 2/1993 | Begala | 162/168.1 |
| 5,292,821 | A | * | 3/1994 | Takaki et al. | 525/328.4 |
| 2004/0118540 | A1 | * | 6/2004 | Garnier et al. | 162/164.1 |

FOREIGN PATENT DOCUMENTS

| | | | |
|---|---|---|---|
| EP | 0377313 | A | 7/1990 |
| JP | 51122188 | A * | 10/1976 |
| JP | 58060094 | | 4/1983 |
| JP | 59135204 | A | 8/1984 |
| JP | 62059602 | A | 3/1987 |
| JP | EP0377313 | A2 * | 11/1990 |
| JP | 4057992 | | 2/1992 |
| JP | 06010296 | A | 1/1994 |
| JP | 06263925 | A | 9/1994 |
| JP | 06184983 | A | 7/2007 |

* cited by examiner

*Primary Examiner* — Matthew J Daniels
*Assistant Examiner* — Jacob Thomas Minskey
(74) *Attorney, Agent, or Firm* — Heslin Rothenberg Farley & Mesiti P.C.

(57) ABSTRACT

In a method of producing a sheet of paper and/or cardboard and similar products, prior to the formation of the sheet from a fibrous suspension, at least two dry strength agents are added to the suspension either separately in any order or mixed together and at one or more injection points, namely: a first agent corresponding to a product for Hofmann degradation in solution on a base (co)polymer comprising at least one non-ionic monomer which is selected from the group containing acrylamide and/or methacrylamide, N,N dimethylacrlamide and/or acrylonitrile; and a second agent corresponding to a (co)polymer having an anionic charge density greater than 0.1 meq/g. The Hofmann degradation product comprises an organic polymer produced at a concentration greater than 3.5% by weight, and preferably greater than 4.5% and the first and second agents are each introduced into the pulp suspension at a concentration of between 0.01 and 2% by weight of active polymer material in relation to the dry weight of the pulp suspension.

16 Claims, No Drawings

METHOD OF PRODUCING HIGH DRY STRENGTH PAPER AND CARDBOARD AND PAPER AND CARDBOARD THUS OBTAINED

CROSS REFERENCE TO RELATED APPLICATIONS

This application is a Section 371 filing of International Application No. PCT/FR2006/050012 filed on Jan. 11, 2006, and published, in French, as International Publication No. WO 2006/075115 A2 on Jul. 20, 2006, and claims priority of French Application No. 0550135 filed on Jan. 17, 2005, all of which applications are hereby incorporated by reference herein, in their entirety.

BACKGROUND ART

The invention concerns paper with improved dry strength and limited resistance in a moist state (optimised) as well as its production method characterised by the joint use of at least two different polymers, one with cationic charges and the other being anionic overall. These polymers work together to exercise a synergistic action on the dry strength of this paper.

More precisely, the invention concerns an improved method for producing paper and/or cardboard and the like, according to which are used at least two (co)polymers to improve the dry strength characteristics during production of cellulose sheets and is characterised in that:

at least one of the agents is obtained by Hofmann degradation reaction on an acrylamide (co)polymer, and at least one second agent is a (co)polymer with an anionic charge density greater than 0.1 meq/g.

According to the invention, the product of the Hofmann degradation is an organic polymer characterised in that:

it is produced in a solution, at a concentration greater than 3.5% by weight, preferably greater than 4.5% and advantageously greater than 10%, from an acrylamide (co)polymer with a molecular weight greater than 5,000;

it has residual anionicity less than 10 moles percent and preferably less than 5 moles percent;

it is obtained by the reaction of an alkaline earth hydroxide and an alkaline earth hypohalide with a hydroxide/hypohalide mole ratio between 2 and 6, preferably between 2 and 5.

This 2-component system can be successfully used in the production of paper and cardboard for packaging, coating base paper, all types of paper, cardboard and the like requiring improved dry strength.

There is a demand for increasingly strong paper and cardboard, notably for the packaging industry.

The dry strength of paper is by definition the strength of a normally dry sheet. The bursting strength and tensile strength values traditionally express the dry strength of the paper.

It is well known that water-soluble cationic polymers can be used to improve the strength characteristics of paper. By their very nature, they can bind directly to the anionic cellulose, giving it a cationic charge so that, combined with anionic polymers, the latter bind to the cellulose fibres, thus improving the dry strength of the sheet.

The most commonly used cationic polymers are compounds such as cationic starch, polyamide epichlorhydrin (PAE), polyamidoamine epichlorhydrin (PAAE) or cationic polyacrylamides, possibly glyoxalated.

The methods described in the prior art using these polymers, however, are not completely satisfactory, notably concerning the quantities of polymers required and/or the wet strength characteristics produced, leading to process difficulties such as grinding the sheet into a pulp for recycling dry broke. This inconvenience is notably observed when implementing the method described in document US 2004/118540.

The bursting strength of the cellulose sheets obtained using dry strength agents should also meet a certain number of requirements. It should notably have no toxicological disadvantages and should provide good compatibility with the other agents involved in producing the sheet.

It has already been proposed, notably in patent applications JP 58-60094 (Hamano) and JP 04-57992 (Mitsui), to combine the Hofmann degradation products with an anionic polymer, said combination being aimed at proposing a high-performance system for the dry strength of the paper sheet.

However, the instability inherent to the polymers obtained with the Hofmann degradation reaction on an acrylamide (co)polymer and their moderate effectiveness when seeking to improve the mechanical properties of the sheet, dissuade those skilled in the art from using the products described in these two Japanese documents.

Document EP-A-377 313 proposes combining an anionic polymer and a Hofmann degradation product produced at very low concentrations, in practice approximately 1% (see Paper making—Example 1). In practice, the degradation product is obtained at high temperatures requiring it to be produced while the sheet is being produced.

With this apparently prohibitive understanding, only very heavy methods used on-site at the paper mill, with a Hofmann degradation product unit or methods using another form of synthesis (using a (co)polymer base such as N-vinylformamide followed by hydrolysis), itself relatively costly, have been set up.

BRIEF SUMMARY OF THE INVENTION

Now, the Applicant has observed that the use of a Hofmann degradation product with a production concentration greater than 1%, in practice greater than 3.5%, before possible dilution, surprisingly provides improvement to dry strength.

The invention therefore aims at a method of the type in question, i.e. a Hofmann degradation product combined with an anionic polymer, which significantly improves the dry strength properties of the paper, while proposing, in combination with a (co)polymer having an anionic charge density greater than 0.1 meq/g, a stable Hofmann degradation product with a high concentration (>3.5% by weight, preferably >4.5%, advantageously greater than 10%), developing limited wet strength without altering the performances of the retention system.

Another purpose and merit of the invention is that it has elaborated a perfected production method for paper pulp, with which there is no specific constraint related to the preparation, cost or effectiveness of the dry strength agents.

The Applicant has discovered and developed an improved method for producing a sheet of paper and/or cardboard and the like, in which, before forming said sheet, will be added to the fibrous suspension, separately or in a mixture, in any order of addition, at a single point or at two points of injection, at least two dry strength agents, respectively:

a first agent corresponding to a Hofmann degradation product in a solution on a (co)polymer (designated hereinafter as the "base (co)polymer") containing at least one non-ionic monomer selected from the group including the acrylamide and/or methacrylamide, N,N dimethylacrylamide and/or acrylonitrile, and a second agent corresponding to a (co)polymer with an anionic charge density greater than 0.1 meq/g (also called anionic resin), said method being characterised in that the Hofmann degradation product is an organic polymer produced at a concentration greater than 3.5% by weight, preferably greater than 4.5% and advantageously greater than 10%, and advantageously obtained from a (co)polymer with a molecular weight greater than 5,000.

For greater clarity, in the rest of the description, in the examples and in the claims, the Hofmann degradation product is designated as the "first agent", even though it may be added to the fibrous suspension after the anionic resin, called the "second agent", and vice-versa.

According to a first characteristic, the Hofmann degradation product has residual anionicity less than 10 moles percent preferably less than 5 moles percent.

According to another characteristic, the Hofmann degradation product is obtained by the reaction of an alkaline earth hydroxide and an alkaline earth hypohalide with a hydroxide/hypohalide mole ratio between 2 and 6, preferably between 2 and 5.

As pointed out above, the aim of the invention is a perfected method which consists in adding to the suspension or fibrous mass or paper pulp, during paper production itself, as dry strength agents, in a mixture or alone, in any order:

between 0.01 and 2% by weight of polymer active material in relation to the dry weight of the fibrous suspension, of at least one polymer obtained by Hofmann degradation reaction on the base (co)polymer, the polymer having a concentration greater than 3.5% by weight, and 0.01 to 2% by weight of polymer active material in relation to the dry weight of the fibrous suspension, of at least one (co)polymer with an anionic charge density greater than 0.1 meq/g.

Surprisingly, the selection of conditions for preparing the Hofmann degradation product:

concentration of the base preferably greater than 20% by weight, providing a final product with a concentration greater than 3.5%, preferably greater than 4.5% and advantageously greater than 10%, low degradation temperature between 0 and 45° C., preferably between 10 and 20° C., resulting in residual anionicity less than 10 moles percent, preferably less than 5 moles percent.

a hydroxide/hypohalide mole ratio between 2 and 6, preferably between 2 and 5, provides, when this product is added to the pulp in combination with an anionic polymer, an unequalled level of performance, at a similar dosage, for dry strength in paper applications.

The method in this invention notably provides very high bursting and tensile strengths, with no negative side effects.

DETAILED DESCRIPTION

A/ Hofmann Degradation Product

This is obtained by a Hofmann degradation reaction on a base (co)polymer.

Hofmann Degradation

This reaction, discovered by Hofmann at the end of the nineteenth century, is used to go from an amide to a primary amine with one fewer carbon atoms. The reaction mechanism is presented below.

In the presence of an alkaline compound (soda), a proton is removed from the amide.

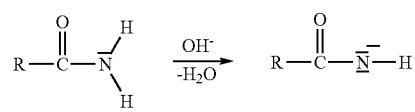

The amidate ion formed then reacts with hypochlorite to produce an N-chloramide. The alkaline compound removes a proton from the chloramide to form an anion.

The anion loses a chloride ion to form a nitrene which undergoes transposition into an isocyanate

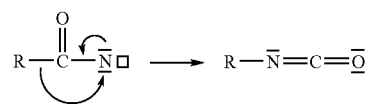

The reaction between the hydroxide ion and the isocyanate forms a carbamate.

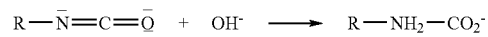

After decarboxylation ($CO_2$ elimination) of the carbamate, a primary amine is obtained.

It should be pointed out that, systematically, some of the initial amide is hydrolysed into carboxylic acid.

"Base" (co)polymer

In practice, the base polymer used contains:

at least one non-ionic monomer selected from the group including acrylamide (and/or methacrylamide), N,N dimethylacrylamide and/or acrylonitrile, and possibly:

at least one unsaturated cationic ethylene monomer, preferably selected from the group including monomers such as dialkylaminoalkyl(meth)acrylamide, diallylamine, methyl diallylamine and their quaternary ammonium or acid salts. We should notably mention diallyldimethyl ammonium chloride (DADMAC), acrylamidopropyltrimethylammonium chloride (APTAC) and/or methacrylamidopropyltrimethylammonium chloride (MAPTAC), and/or at least one other non-ionic monomer preferably selected from the group including N-vinyl acetamide, N-vinyl formamide, N-vinyl pyrrolidone and/or vinyl acetate.

Optionally, the base polymer may also be very slightly amphoteric (less than 5 moles percent) and may have, for example, anionic charges on acid or anhydrous monomers such as (meth)acrylic acid, acrylamidomethylpropane sulfonic acid, itaconic acid, maleic anhydride, maleic acid, methallyl sulfonic acid, vinyl sulfonic acid and their salts.

It is important to note that, combined with these monomers, it is also possible to use non-water-soluble monomers such as acrylic, allyl or vinyl monomers containing a hydrophobic group. These monomers will be used in very small quantities, less than 20 moles percent, preferably less than 10 moles percent, and will preferably be selected from the group including acrylamide derivatives such as N-alkylacrylamide, for example N-tert-butylacrylamide, octylacrylamide and N,N-dialkylacrylamides such as N,N-dihexylacrylamide, etc., acrylic acid derivatives such as alkyl acrylates and methacrylates, etc.

It is known that the base polymer can also be branched. As we know, a branched polymer is a polymer that has a principal chain of branches, groups or branching, laid out on a plane.

Branching can be performed preferably during (or possibly after) polymerisation, in presence of a branching agent and possibly a transfer agent. The following is a non-exhaustive list of branching agents: methylene-bis-acrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, glycidyl ether compounds such as ethylene glycol diglycidyl ether, or epoxies or any other means known to those skilled in the art for branching.

In practice, the branching agent is methylene-bis-acrylamide (MBA) added at five to five thousand (5 to 5,000) parts per million by weight, preferably 5 to 1,000.

The following is a non-exhaustive list of transfer agents: isopropyl alcohol, sodium hypophosphite, mercaptoethanol, etc.

Persons skilled in the art will be able to choose the best combination in relation to their own knowledge and the present description, as well as the examples to follow.

The (co)polymer used as the base for the Hofmann degradation reaction does not require the development of any particular polymerisation method. The technical principles for polymerisation, well known to those skilled in the art, which can be used include: precipitation polymerisation, emulsion polymerisation (aqueous or reverse), whether followed or not by a distillation and/or spray drying step, and suspension polymerisation or solution polymerisation, these last two techniques being preferred.

This base is characterised in that is has a molecular weight greater than 5,000 with no maximum limit.

Hofmann Degradation Reaction on the Base Polymer

The Hofmann reaction requires the conversion of amide functions into amine functions through 2 principal factors (expressed in mole ratios):

Alpha=(alkaline earth hypohalide/(meth)acrylamide)

Beta=(alkaline earth hydroxide/alkaline earth hypohalide)

Using a base polymer solution (polyacrylamide) at a concentration preferably between 20 and 40%, the mole quantity of the total (meth)acrylamide fluction is determined. The desired level of alpha degradation is then chosen (corresponding to the degree of amine function desired) to determine the dry quantity of alkaline earth hypohalide and then the beta coefficient, which is used to determine the dry quantity of alkaline earth hydroxide.

A solution of alkaline earth hypohalide and alkaline earth hydroxide is then prepared using the alpha and beta ratios.

To stabilise the amine functions to be produced, we add, in the reactor containing the base polymer, one (or more) quaternary ammonium derivatives as described in patent JP 57077398 and well known to those skilled in the art, which avoids the reaction between the residual amine and amide functions.

The reactor is then cooled to a temperature between 0 and 45° C., preferably between 10 and 20° C., while continuing mechanical agitation. The alkaline earth hypohalide and alkaline earth hydroxide solution is then poured, in stages or continuously, into the reactor, while absorbing the heat produced by the reaction through refrigeration.

Once the total quantity of alkaline earth hypohalide/alkaline earth hydroxide solution has been added, an acid solution is prepared in another reactor with mechanical agitation. The content of the mixture obtained is then added to the reactor containing the acid and decarboxylation takes place.

A simple pH adjustment (between 2 and 7) is then applied at the end of the reaction.

Once finished, the Hofmann degradation product is at a concentration greater than 3.5%, and generally greater than 4.5%.

Depending on the alpha degree of degradation, it is possible to generate variations in cationicity linked to the quantity of amine functions produced on the carbon backbone of the polymer.

Furthermore, it is possible to achieve a concentration of the Hofmann degradation product in a solution greater than 10%, or even 15% and more, by using concentration methods such as ultrafiltration or diafiltration, with no negative effects on the product.

In practice, the quantity of Hofmann degradation product added to the cellulose suspension is between 100 and 20,000 grams of active polymer per metric ton of dry pulp, i.e. between 0.01% and 2%.

It has been observed that, if the quantity is less than 0.01%, no significant improvement is obtained in the mechanical properties of the sheet. Furthermore, if this quantity exceeds 2%, it is no longer of commercial interest.

The injection or addition of the dry strength agent according to the invention is possible with a slushed pulp, or in a diluted pulp, i.e. in chests of slushed pulp after refining until the white water circuit.

B/ Anionic Resin: (co)polymer with an Anionic Charge Density Greater than 0.1 meq/g.

In practice, the anionic resin is a water-soluble organic polymer with an anionic charge density greater than 0.1 meq/g, characterised in that it is obtained from:

1 to 100 moles percent of at least one monomer with an anionic charge, and 0 to 99 moles percent of at least one monomer with a neutral and/or cationic charge.

The following is a non-exhaustive list of monomers which may be used:

a/ anionic monomers with a carboxylic function (for example: acrylic acid, methacrylic acid and their salts, etc.), with a sulfonic acid function (for example: 2-acrylamido-2-methylpropane sulfonic acid (AMPS), vinyl sulfonic acid, methallyl sulfonic acid and their salts, etc.).

b/ non-ionic monomers: acrylamide, methacrylamide, N,N dimethylacrylamide, N-vinyl pyrrolidone, N-vinyl acetamide, N-vinyl formamide, vinyl acetate, acrylate esters, allyl alcohol, etc. and/or cationic monomers: we will notably mention, in a non-exhaustive list, dimethylaminoethyl acrylate (DMAEA) and/or dimethylaminoethyle methacrylate (DMAEMA), quaternised or salified, diallyldimethyl ammonium chloride (DADMAC), acrylamidopropyltrimethylammonium chloride (APTAC) and/or methacrylamidopropyltrimethylammonium chloride (MAPTAC).

Combined with these monomers, it is also possible to use non-water-soluble monomers such as acrylic, allyl or vinyl monomers containing a hydrophobic group. These monomers will be used in very small quantities, less than 20 moles percent, preferably less than 10 moles percent, and will preferably be selected from the group including acrylamide derivatives such as N-alkylacrylamide, for example N-tert-butylacrylamide or octylacrylamide, and N,N-dialkylacrylamides such as N,N-dihexylacrylamide, etc., acrylic acid derivatives such as alkyl acrylates and methacrylates, etc.

The anionic resin does not require the development of any particular polymerisation method. It can be obtained using any of the polymerisation techniques well known to those skilled in the art: gel polymerisation, precipitation polymerisation, emulsion polymerisation (aqueous or reverse) whether followed or not by a distillation and/or spray drying step, suspension polymerisation, solution polymerisation, etc.

According to a particular, preferred embodiment, the (co)polymer with an anionic charge density greater than 0.1 meq/g is branched. This is done by adding, before, during and/or after polymerisation, a branching agent in presence or not of a transfer agent. When the branching agent is glyoxal, it is added after polymerisation.

The following is a non-exhaustive list of branching agents: methylene-bis-acrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, glycidyl ether compounds such as ethylene glycol diglycidyl ether, or epoxies or any other means known to those skilled in the art for branching.

The following is a non-exhaustive list of transfer agents: isopropyl alcohol, sodium hypophosphite, mercaptoethanol, etc.

In practice, the second dry strength agent added to the suspension, quite preferably, at 100 g/t to 20,000 g/t by weight of active material (polymer) in relation to the dry weight of the fibrous suspension, preferably between 500 g/t and 5,000 g/t.

For commercial reasons, we shall seek to propose the dry strength agents in the invention in the most highly concentrated form possible, using suitable concentration techniques well known to those skilled in the art. It should also be noted that these agents may be added separately, simultaneously, in mixtures or not, in any order of addition and at one or more points of injection.

The following examples illustrate the invention without restricting its scope.

EXAMPLES

Presentation of Dry Strength Agents a/ Hofmann Degradation Product

The product was obtained using Hofmann degradation of an acrylamide homopolymer or an acrylamide and diallyldimethyl ammonium chloride (DADMAC) copolymer at a temperature of 10° C., using sodium hypochlorite, sodium hydroxide and hydrochloric acid (used as reagents according to the aforementioned method). The base polymers were polymerised in an aqueous solution at a 25% concentration.

In the following examples, the following polymers are used:

| Hofmann degradation product | Composition | Viscosity of the base solution (cps) | Molecular weight g/mol | Cationic charge (meq/g) | Concentration (in % weight) |
|---|---|---|---|---|---|
| C1 | AM | 50 | 4,000 | 4.8 | 9.7 |
| C2 | AM | 270 | 25,000 | 4.8 | 9.7 |
| C3 | AM | 1,325 | 50,000 | 4.8 | 9.7 |
| C4 | AM | 8,500 | 200,000 | 4.8 | 9.7 |
| C5 | AM | 50 | 4,000 | 9.6 | 4.8 |
| C6 | AM | 270 | 25,000 | 9.6 | 4.8 |
| C7 | AM | 1,325 | 50,000 | 9.6 | 4.8 |
| C8 beta 2 | AM | 8,500 | 200,000 | 9.6 | 4.8 |
| C9 | AM/DADMAC | 2,500 | 80,000 | 8.0 | 6.3 |

AM = acrylamide homopolymer
AM/DADMAC = acrylamide copolymer/DADMAC (95/5 mol %)
C1-C4: alpha = 0.5/beta = 2
C5-C8: alpha = 1/beta = 2
C9: alpha = 0.95/beta = 2

It should be noted that there is a direct correlation between the viscosity of the base solution and the molecular weight of the polymer (a viscosity of 50 cps at 25% (C1) concentration corresponds to a molecular weight of approximately 4,000 g/mol). The greater the viscosity of the solution, the greater the molecular weight.

b/ Anionic Resin: (co)polymer with an Anionic Charge Density Greater than 0.1 meq/g The anionic resins tested are acrylamide and acrylic acid copolymers obtained by polymerisation in a solution at 15%. Some polymers have a linear structure and others are branched. Furthermore, we have also produced:

- a terpolymer, by replacing part of the acrylic acid with sodium methallyl sulfonate (SMS) to obtain a product with the same charge density, but at a 40% concentration and a bulk viscosity of just 1,000 cps;

- and an amphoteric linear polymer with an anionic charge overall.

In the following examples, the following polymers are used:

| Anionic resin | Composition | Mole ratio | Anionicity (meq/g) | Structure | Viscosity of the polymer solution (cps) |
|---|---|---|---|---|---|
| A1 | AM/AA | 70/30 | 3.85 | Linear | 2,500 |
| A2 | AM/AA | 70/30 | 3.85 | Branched (MBA) | 2,500 |
| A3 | AM/AA/SMS | 66/19/15 | 3.85 | Branched (MBA) | 1,000 |
| A4 | AM/AA/ DMAEA MeCl | 83/10/7 | 0.48 | Linear | 9,000 |
| A5 | AM/AA | 55/28/17 (glyoxal) | 3.75 | Branched (glyoxal) | 2,500 |

AA = Acrylic acid
DMAEA MeCl = dimethylaminoethyl acrylate quaternised with methyl chloride Test Procedure for Dry Strength Properties Paper handsheets are made with an automatic dynamic handsheet machine. Firstly, the paper pulp is prepared by disintegrating 90 grams of virgin kraft paper fibres in 2 litres of hot water for 30 minutes. The pulp obtained is then diluted to a total volume of 9 litres. Once the consistency has been precisely measured, the quantity of pulp needed is taken to obtain in the end a sheet with a 60 g/m² grammage.

The pulp is then placed in the chest of the dynamic handsheet machine, diluted to a consistency of 0.32% and stirred moderately with a mechanical agitator to homogenise the fibrous suspension.

In manual mode, the pulp is pumped into the nozzle to prime the circuit.

A blotter and the forming fabric are placed in the bowl of the dynamic handsheet machine before starting bowl rotation at 900 m/min and forming the waterwall. The different dry strength agents are then added to the stirred fibrous suspension with a 30-second contact time for each polymer. The sheet is then formed (in automatic mode) by 22 round-trips of the nozzle spraying the pulp in the waterwall. Once the water has been drained off and the automatic sequence has been completed, the forming fabric with the network of fibres formed is removed from the bowl of the dynamic handsheet machine and placed on a table. A dry blotter is placed on the wet fibre mat side and is pressed once with a roller. The whole is turned over and the fabric is delicately separated from the fibre mat. A second dry blotter is applied and the sheet (between the two blotters) is pressed once under a press applying 4 bars and then dried on a drying frame for 9 min at 107° C. The two blotters are then removed and the sheet is stored overnight in a room with controlled humidity and temperature (50% relative humidity and 23° C.).

The dry and wet strength properties of all of the sheets obtained with this procedure are then evaluated.

Bursting is measured with a Messmer Buchel M 405 bursting strength tester (average of 14 measurements).

Dry tensile strength and/or tensile energy absorbed (TEA) are measured in machine direction with a Testometric AX tensile device (average of 5 samples).

Wet tensile strength is measured in machine direction with a Testometric AX tensile device after soaking the sample for 20 seconds in a Finch cup filled with deionised water (average of 5 samples).

In all of the following examples, and except where otherwise indicated, the sheets of paper are produced using the above procedure by first adding the cationic dry strength agent (Hofmann degradation product) at a dose of 2 kg/T (dry polymer/dry fibre), then the anionic resin at a dose of 3 kg/T (dry polymer/dry fibre).

The tests are performed using a pulp with neutral pH.

TABLE 1

Effect of the nature of the Hofmann degradation product
The counterexample (CE1) is a polyvinyl amine (cationicity: 9.6 meq/g), such as Catiofast ™ PR 8106, obtained by base hydrolysis of a vinyl formamide homopolymer (aqueous solution at a 25% concentration).

| Sheet number | Hofmann degradation product | Anionic resin | Bursting index | Dry TEA (J/m²) | Wet tensile strength (m) |
|---|---|---|---|---|---|
| Control | — | — | 1.788 | 36.50 | 50 |
| 1 | C8 beta 2 | A2 | 2.506 | 76.25 | 278 |
| 2 | C9 | A2 | 2.435 | 74.62 | 241 |
| 3 | CE1 | A2 | 2.498 | 75.03 | 418 |
| 4 | C8 beta 2 | — | 2.101 | 59.84 | 243 |

Compared with example 4, example 2 demonstrates the synergistic effect resulting from the combination of the 2 dry strength agents.

Moreover, looking at the results, it is clear and surprising that use, as the first dry strength agent, of a polyvinyl amine with the same cationicity but from a different channel of preparation (base hydrolysis of a vinyl formamide homopolymer) has a highly negative effect on wet strength, contrary to the Hofmann degradation product in the invention.

Furthermore, the use of an acrylamide/DADMAC copolymer as a base instead of an acrylamide homopolymer provides, after Hofmann degradation, a satisfactory level of dry strength while also having a limited effect on wet tensile strength.

TABLE 2

Effect of the molecular weight of the base (co)polymer (before Hofmann degradation)

| Sheet number | Hofmann degradation product | Anionic resin | Dry tensile strength (km) | Bursting index |
|---|---|---|---|---|
| Control | — | — | 4.045 | 1.998 |
| 5 | C1 | A2 | 3.495 | 1.716 |
| 6 | C2 | A2 | 4.146 | 2.100 |
| 7 | C3 | A2 | 4.343 | 2.297 |
| 8 | C4 | A2 | 4.453 | 2.331 |

TABLE 2-continued

Effect of the molecular weight of the base (co)polymer (before Hofmann degradation)

| Sheet number | Hofmann degradation product | Anionic resin | Dry tensile strength (km) | Bursting index |
|---|---|---|---|---|
| 9 | C5 | A2 | 3.790 | 1.750 |
| 10 | C6 | A2 | 4.547 | 2.443 |
| 11 | C7 | A2 | 4.613 | 2.501 |
| 1 | C8 beta 2 | A2 | 4.816 | 2.506 |

These results clearly show that, at a constant cationic charge, the dry strength properties increase when the molecular weight of the polyacrylamide base increases (sheets 5-8, 9-11 & 1).

Furthermore, we can see that an increase in cationicity can counterbalance the negative effect of a low molecular weight, but up to a lower limit (C1, PM=4,000) where this effect is no longer effective.

TABLE 3

Effect of the beta ($\beta$) coefficient value on the retention agents
To evaluate the effect of the beta factor (mole ratio: alkaline earth hydroxide/alkaline earth hypohalide), tests were performed in which this factor was varied by 2 to 7 (C8 beta 2 to C8 beta 7), while maintaining the alpha ratio at 1.

| Beta | Cationicity meq/g | Concentration % |
|---|---|---|
| 2 | 9.6 | 4.8 |
| 4 | 10.2 | 3.9 |
| 5 | 11.2 | 3.5 |
| 7 | 11.7 | 2.9 |

The table above shows that it is possible to increase the yield of the conversion of amide functions into amine functions by increasing the beta ratio. The higher $\beta$ is, the greater the cationic charge density achieved for the polyvinyl amine.

To determine the effect of the $\beta$ coefficient in the overall production method for the sheet of paper, we carried out a study with a standard retention agent with high molecular weight, using DMAEA quaternised with methyl chloride copolymer, reference number FO 4190 PG 2.

A paper pulp comprising a mixture of 70% bleached hardwood Kraft, 20% unbleached mechanical pulp and 10% bleached softwood Kraft, is refined to a Canadian Standard Freeness of 400 ml. We add 20% calcium carbonate to the 1.5% fibrous suspension, then dilute the whole to a concentration of 0.5% for the test, then prepare as many 500-g beakers (i.e. 2.5 g dry) as needed for the study.

The retention test device is a dynamic Britt Jar, well known to those skilled in the art, and which is used to simulate the effects of shearing and contact time for the retention polymer in contact with the paper pulp. The principle of the test is to add, in a stirred medium, the different additives used in the production of paper following a pre-set sequence. In the case in the example, a 1-minute contact time between the products in the invention and the paper pulp is used, then 20 seconds with FO 4190 PG 2 before removing 100 ml of the so-called white water which drains out under the equipment screen.

This water is then filtered, the quantity gathered is weighed and then incinerated to determine the FPR and FPAR. The factors analysed are first pass retention (FPR %) and first pass ash retention (FPAR %).

$$FPR(\%)=(2.5-(\text{dry mass of material for 100 ml})^*)/2.5$$

$$FPAR(\%)=(0.416-(\text{ash mass for 100 ml})^*5)/0.416$$

The dose of retention agent FO 4190 PG 2 is 0.03% in relation to dry paper, i.e. 300 g/metric ton of paper produced.

The dose of Hofmann degradation products is 0.5% in relation to dry paper, i.e. 5,000 g/metric ton of paper produced and 1% in relation to dry paper, i.e. 10,000 g/metric ton of paper produced for the secondary anionic agent.

| Sheet number | Hofmann degradation product | Anionic resin | FO 4190 PG 2 | FPR (%) | FPAR (%) |
|---|---|---|---|---|---|
| Control | — | — | 0.03% | 78 | 42 |
| 12 | C8 beta 2 | A2 | 0.03% | 80 | 60 |
| 13 | C8 beta 4 | A2 | 0.03% | 80.5 | 62 |
| 14 | C8 beta 5 | A2 | 0.03% | 79.2 | 54 |
| 15 | C8 beta 7 | A2 | 0.03% | 77 | 35 |

We can see that, despite the higher cationicity, an increase in the beta coefficient leads to deactivation of the retention polymer and therefore to a drop in charge retention.

TABLE 4

Effect of the $\beta$ coefficient on the physical properties of the paper
On the same acrylamide homopolymer base, Hoffman degradation reactions are performed with 2 different $\beta$ values
($\beta = 2$ and $\beta = 7$).

| Sheet number | Hofmann degradation product | Anionic resin | Dry tensile strength (km) | Bursting index | Wet tensile strength (m) |
|---|---|---|---|---|---|
| Control | — | — | 4.279 | 1.998 | 51 |
| 1 | C8 beta 2 | A2 | 4.816 | 2.506 | 278 |
| 16 | C8 beta 7 | A2 | 5.031 | 2.508 | 350 |

We can see that the dry strength properties as well as wet strength properties increase when the $\beta$ value increases.

TABLE 5

Effect of the type of anionic polymer used as an anionic resin

| Sheet number | Hofmann degradation product | Anionic resin | Bursting index | Dry TEA (J/m$^2$) | Wet tensile strength (m) |
|---|---|---|---|---|---|
| Control | | | 1.788 | 36.50 | 50 |
| 17 | C8 beta 2 | A1 | 2.402 | 65.10 | 271 |
| 1 | C8 beta 2 | A2 | 2.506 | 76.25 | 278 |
| 18 | C8 beta 2 | A3 | 2.424 | 68.20 | 273 |
| 19 | C8 beta 2 | A4 | 2.445 | 70.61 | 273 |

It is clear that dry strength is increased by using as an anionic resin a branched polymer (A3 and especially A2) rather than a linear polymer (A1). It should also be pointed out that an amphoteric polymer (A4) provides the same level of performance as a purely anionic polymer. Furthermore, we can see that the type of anionic polymer does not affect wet strength.

TABLE 6

Effect of the concentration during degradation
In the following tests, we sought to compare, for identical alpha and beta coefficient values, the effect of the polymer concentration during the Hofmann degradation reaction, also indirectly expressed by the final concentration of the first dry strength agent.
Hofmann degradation products C8 alpha 1 beta 2 and C8 alpha 1 beta 5 according to this invention, produced at respective concentrations of active materials of 4.9 and from a base polymer at a 25% concentration and compared with two polymers having a final production concentration of active materials of 2 and 3%:
CE2: acrylamide homopolymer identical to that used for C8, but diluted to a concentration of 3% before the Hofmann degradation reaction (final production concentration of 2%),
CE3: acrylamide homopolymer identical to that used for C8, but diluted to a concentration of 8% before the Hofmann degradation reaction (final production concentration of 3%).

| Sheet number | Hofmann degradation product | Conc. of Hofmann degradation product | Anionic resin | Bursting index | Dry TEA (J/m$^2$) | Wet tensile strength (m) |
|---|---|---|---|---|---|---|
| Control | | | | 1.788 | 36.50 | 50 |
| 1 | C8 beta 2 | 4.8 | A2 | 2.506 | 76.25 | 278 |
| 20 | C8 beta 5 | 3.5 | A2 | 2.509 | 76.15 | 288 |
| 21 | CE2 | 2 | A2 | 2.273 | 68.7 | 274 |
| 22 | CE3 | 3 | A2 | 2.251 | 68.81 | 286 |
| 23 | C8 beta 2 | 12 | A2 | 2.507 | 76.17 | 279 |

We can see that the Hofmann degradation reaction, when performed on a polymer at a stronger concentration (leading to a high final concentration of active materials, greater than or equal to 3.5%), provides significantly better performances than those described for a polymer at a lower concentration less than or equal to 3%.

Sheet 23 was obtained using Hofmann degradation product C8 beta 2 concentrated with an ultrafiltration method.

Furthermore, we can see that, when the Hofmann degradation product is concentrated using an ultrafiltration method, there is no negative impact on the activity of the polymer.

TABLE 7

Additional tests

| Sheet number | Hofmann degradation product | Anionic resin | Bursting index | Dry TEA (J/m$^2$) |
|---|---|---|---|---|
| Control | — | — | 1.788 | 36.50 |
| 1 | C8 beta 2 | A2 | 2.506 | 76.25 |
| 24 | C8 beta 2/A2 used in a mixture | | 2,315 | 65.2 |
| 25 | A2 | C8 beta 2 | 2.205 | 59.81 |
| 26 | C8 beta 2 | A5 | 2.218 | 63.43 |

* For sheet 25, contrary to examples 1 and 26, the anionic resin is added first, before the Hofmann degradation product.

Given the above results, it appears that the order of addition (24 and 25/1) only has a moderate impact on the dry strength measurements. The best results, however, are obtained when added in the order used in the preparation of sheet 1.

Furthermore, we can see that the glyoxalated anionic resin gives results inferior to those of the anionic resins branched during polymerisation.

The invention claimed is:

1. Production method for a sheet of paper and/or cardboard, according to which, before forming said sheet from a fibrous suspension, are added to the fibrous suspension, separately or in a mixture, in any order of addition, in one or more points of injection, at least two dry strength agents, respectively:

a first agent corresponding to a Hofmann degradation product in a solution on a base (co)polymer containing at least one non-ionic monomer selected from the group including acrylamide and/or methacrylamide, N,N dimethylacrylamide and/or acrylonitrile, and a second agent corresponding to a (co)polymer with an anionic charge density greater than 0.1 meq/g, wherein the Hofmann degradation product comprises an organic polymer produced at a temperature of 0 to 45° C. and at a concentration greater than 3.5% by weight, and wherein the first and second agents are added to the fibrous suspension at 0.01 to 2% each by weight of active polymer material in relation to a dry weight of the fibrous suspension.

2. Method as claimed in claim 1, wherein the Hofmann degradation product has anionicity less than 10 moles percent.

3. Method as claimed in claim 2, wherein the Hofmann degradation product has anionicity less than 5 moles percent.

4. Method as claimed in claim 1, wherein the base (co) polymer has a molecular weight greater than 5,000.

5. Method as claimed in claim 1, wherein the Hofmann degradation product is obtained by reaction of an alkaline earth hydroxide and an alkaline earth hypohalide with a hydroxide/hypohalide mole ratio between 2 and 6.

6. Method as claimed in claim 5, wherein the hydroxide/hypohalide mole ratio is between 2 and 5.

7. Method as claimed in claim 1, wherein the first agent corresponds to a Hofmann degradation product on a base (co)polymer containing:

at least one non-ionic monomer selected from the group including acrylamide and/or methacrylamide, N,N dimethylacrylamide and/or acrylonitrile, and at least one unsaturated cationic ethylene monomer.

8. Method as claimed in claim 7, wherein the at least one unsaturated cationic ethylene monomer is selected from the group including dialkylaminoalkyl (meth)acrylamide, diallylamine, methyl diallylamine and their quaternary ammonium or acid salts, and/or at least one non-ionic monomer selected from the group including N-vinyl acetamide, N-vinyl formamide, N-vinyl pyrrolidone and/or vinyl acetate.

9. Method as claimed in claim 1, wherein, when the base (co)polymer is a copolymer, the copolymer contains monomers with anionic charges at a level less than 5 moles percent.

10. Method as claimed in claim 1, wherein the second agent is obtained from:
- 1 to 100 moles percent of at least one monomer with an anionic charge,
- and 0 to 99 moles percent of at least one monomer with a neutral and/or cationic charge.

11. Method as claimed in claim 10, wherein the second agent is obtained from monomers comprising anionic monomers with a carboxylic function selected from the group including acrylic acid, methacrylic acid and their salts, etc., and/or having a sulfonic acid function selected from the group including 2-acrylamido-2-methylpropane sulfonic acid (AMPS), vinyl sulfonic acid, methallyl sulfonic acid and their salts, etc., and/or non-ionic monomers selected from the group including acrylamide, methacrylamide, N,N dimethylacrylamide, N-vinyl pyrrolidone, N-vinyl acetamide, N-vinyl formamide, vinyl acetate, acrylate esters, allyl alcohol, etc, and/or cationic monomers selected from the group including dimethylaminoethyl acrylate (DMAEA) and/or dimethylaminoethyle methacrylate (DMAEMA), quaternised or salified, diallyldimethyl ammonium chloride (DADMAC), acrylamidopropyltrimethylammonium chloride (APTAC) and/or methacrylamidopropyltrimethylammonium chloride (MAPTAC).

12. Method as claimed in claim 1, wherein the second agent is branched.

13. Method as claimed in claim 12, wherein the second agent is branched during polymerisation.

14. Method as claimed in claim 1, wherein the Hofmann degradation product is added before the (co)polymer with an anionic charge density greater than 0.1 meq/g.

15. Method as claimed in claim 1, wherein the Hofmann degradation product is obtained by Hofmann degradation reaction on a base (co)polymer at a concentration greater than 20% by weight.

16. Method as claimed in claim 1, wherein the Hofmann degradation product comprises an organic polymer produced at a concentration greater than 4.5% by weight.

* * * * *